United States Patent [19]

Walker

[11] 4,454,418

[45] Jun. 12, 1984

[54] INTEGRATED OPTICS TRANSDUCER

[76] Inventor: Clifford G. Walker, 915 Weatherly Rd., Huntsville, Ala. 35803

[21] Appl. No.: 371,867

[22] Filed: Apr. 26, 1982

[51] Int. Cl.³ .............................................. G02B 5/14
[52] U.S. Cl. ................................. 250/227; 250/231 R; 73/657; 73/705; 324/96
[58] Field of Search .............. 250/227, 231 R; 73/657, 73/705; 324/96

[56] References Cited

U.S. PATENT DOCUMENTS

| 3,506,362 | 4/1970 | Doyle et al. | 356/111 |
| 3,517,560 | 6/1970 | Jacobs et al. | 73/516 |
| 3,800,594 | 4/1974 | Hutchings et al. | 73/516 R |
| 4,039,260 | 8/1977 | Redman | 356/106 |
| 4,155,251 | 5/1979 | Lautzenhiser | 73/141 A |
| 4,233,847 | 11/1980 | Walker | 73/517 R |

OTHER PUBLICATIONS

Goss et al., "Fiber-Optic Rotation Sensor Technology" from Applied Optics, vol. 19, No. 6, Mar. 15, 1980, pp. 852-858.
Merz et al., "GaAs Integrated Optical Circuits by Wet Chemical Etching" from IEEE Journal of Quantum Electronics, vol. QE-15, No. 2, Feb. 1979, pp. 72-82.
Garmire, "Optical Waveguide for Laser Gyro Applications" from SPIE vol. 157, Laser Inertial Rotation Sensors, 1978, pp. 95-99.
Leonberger et al., "Low-Loss GaAs p+n−n+three-Dimensional Optical Waveguides" from Applied Physics Letters, vol. 28, No. 10, May 15, 1976, pp. 616-619.
Anderson, "Integrated Optical Spectrum Analyzer: An Imminent 'chip'", IEEE Spectrum, Dec. 1974, pp. 22-29.

Primary Examiner—William L. Sikes
Assistant Examiner—Darwin R. Hostetter
Attorney, Agent, or Firm—Robert P. Gibson; Anthony T. Lane; Freddie M. Bush

[57] ABSTRACT

A transducer utilizes a laser source, photoelastic waveguides, two optical beam paths and detectors for processing optical energy from the laser through a stress transfer medium and thereby detects stress forces present on the transducer. This allows forces such as pressure, strain, voltage, or current to be detected and converted from one form to another for measurement of the force and response thereto. Input forces are detected as optical frequency shifts and converted to electrical signal outputs for indicating circuitry. In an integrated optic format, the transducer package volume is small, allowing ready use in guidance or navigation systems. Light generated by the laser travels along two paths, is optically stressed by the force transfer member and is either combined or compared with a reference signal to obtain the stress intelligence.

8 Claims, 5 Drawing Figures

INTEGRATED OPTICS TRANSDUCER

DEDICATORY CLAUSE

The invention described herein may be manufactured, used, and licensed by or for the Government for governmental purposes without the payment to me of any royalties thereon.

SUMMARY OF THE INVENTION

An integrated optics transducer circuit for frequency detection produces an output beam frequency that is modified in proportion to a change in the magnitude of input energy such as from pressure, strain, voltage, or current. For frequency detection a reference input beam is frequency modulated (FM) using a Bragg cell prior to the beam's entering a ring resonator. The beam exits the ring resonator and is detected by a photodetector which is part of an electrical FM feedback circuit. The feedback circuit maintains the beam resonance within the ring resonator. When a change in magnitude of energy applied to the ring resonator occurs it causes a change in the optical path length of the resonator, detuning the resonator and changing the beam intensity coupled out. The detector detects this change in beam intensity and by way of the FM feedback circuit, changes the input frequency to the Bragg cell. This restores resonance in the ring resonator. The change in frequency is proportional to the change in input energy.

DESCRIPTION OF THE PREFERRED EMBODIMENT

Figure 1:
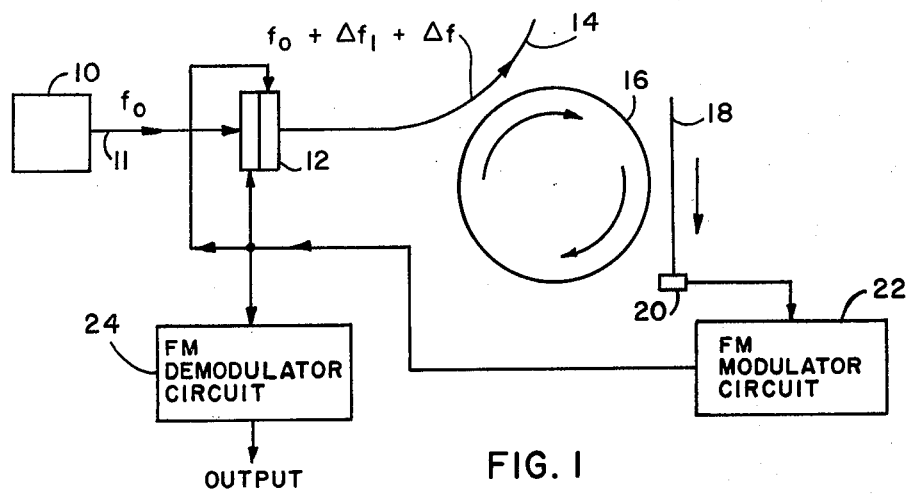
FIG. 1 is a diagrammatic view of the frequency detection transducer using integrated optics and electronics.

Referring now to the drawings wherein like numbers represent like parts, a frequency detection transducer is shown in FIG. 1. A laser source 10, input waveguide 11, dual Bragg cells 12, an intermediate waveguide 14, ring resonator 16 and an output waveguide 18 comprises the optical circuitry. A photodetector 20, FM modulator 22 and a FM demodulator 24 comprises the electrical circuitry. Output signals from the demodulator may be coupled to any monitoring system such as a visual display or a computer.

Figure 2A:
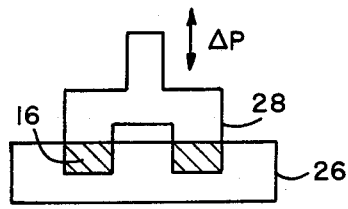
FIGS. 2A, 2B, and 2C are diagrammatic views of the ring resonator portion of the waveguide assembly, showing various stress or force transfer members coupled to the waveguide.
Figure 2B:
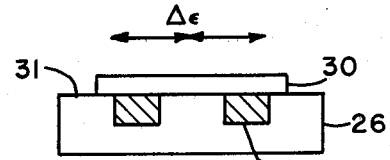
Figure 2C:
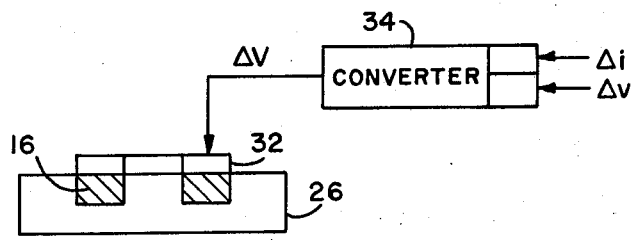

A stress transfer element, as shown in FIGS. 2A–2C, is mounted on electro-optic photoelastic ring resonator 16 and responds to forces such as pressure, strain, voltage or current to stress resonator 16. Substrate 26, which contains the ring resonator 16 and other optical circuit portions therein, may be a gallium arsinide or other similar structure used in integrated optic systems.

In the diagrammatic view of FIG. 2A ring resonator waveguide 16 is formed in a substrate 26 and a stress transfer element 28 is fixedly attached in a ring shape to the surface of the waveguide for applying pressure forces normal thereto. Pressure or force $\Delta p$ is applied normal to the surface of the substrate.

FIG. 2B discloses a proof mass 30 disposed across a portion of the surface 31 of substrate 26 and including the waveguide 16 surface for measuring strain, strain forces $\Delta \epsilon$ being applied in a plane parallel with the plane of substrate 26.

FIG. 2C discloses a transfer element or stress producing member 32 such as an electrooptic element attached to resonator 16, which receives a voltage input $\Delta V$ from a converter 34 and responds with a mechanical force output, stressing waveguided 16. Converter 34 may be a current-to-voltage converter circuit as a voltage converter for responding to the desired input $\Delta i$ or $\Delta v$ to provide the representative $\Delta V$ output.

The externally applied energy in the form of pressure, strain, current, or voltage forces stresses ring resonator waveguide 16 in compression or tension depending on the direction of the forces, and thereby changes the optical path length of the waveguide.

In operation of the integrated optics transducer structure of FIG. 1, the laser beams are coupled between adjacent waveguides using waveguide-to-waveguide directional coupling (W-W-DC) methods as is well known in the art. The horizontally polarized laser beam from source 10 has an output frequency $f_0$ polarized perpendicular to the direction of stress forces on waveguide 16. The laser beam travels through waveguide 11 and into the dual Bragg cell 12 where the beam is FM modulated prior to entering the ring resonator. The laser beam coupled into resonator waveguide 16 is allowed to enter output waveguide 18 by way of W-W-DC and is detected by detector 20. The detector is part of the feedback circuit that drives Bragg cells 12 by way of the FM modulator circuit 22. The FM demodulator circuit 24 responds to the output of modulator 22 and develops the transducer output signal, the output being proportional to the change in input pressure strain, current, or voltage.

With no stress input to the system ($\Delta f_1 = 0$) a beam with a frequency of $f_0 + \Delta f$ is coupled from Bragg cells 12 into waveguide 14. This output beam is transfered into ring resonator waveguide 16. At this frequency $(f_0 + \Delta f)$ resonance is established in the ring resonator, and maximum beam energy circulates therein, which produces maximum beam energy transfer to the output waveguide 18. Detector 20 detects the beam energy present in waveguide 18 and provides an electrical output to the modulator circuit. Modulator 22 generates the dither frequency output, $\Delta f$, which maintains resonance in ring resonator 16 by stimulating the dual acousto-optic Bragg cells 12. By using two Bragg cells the laser beam output angle change is minimized. The dither frequency, $\Delta f$, from modulator 22 sweeps ring resonator waveguide 16 such that the power-frequency transmission curve (not shown) of the resonator changes at a rate that produces detector 20 shot-noise-limited operation and at a frequency magnitude that includes the maximum slope points on the resonator power-frequency transmission curve so that transducer operation sensitivity is maximized.

With a stress input applied through members 28, 30, or 32 to the resonator, the index of refraction of the resonator is changed, detuning the resonator and generating a change in the beam intensity output coupled to waveguide 18. This change detected by photodetector 20 is coupled to modulator 22 which produces a frequency $\Delta f_1$. $\Delta f_1$ is added to $\Delta f$ and provides additional drive to Bragg cell 12, thereby changing the input laser beam frequency coupled to the resonator. This change in frequency restores resonance in resonator 16. The change in frequency $\Delta f_1$ varies depending on the degree of stress and is proportional to the change in stress input. The change in frequency $\Delta f_1$ is determined mathematically as follows:

$$\Delta f_1 = \Delta n f_0 \tag{1}$$

where
$\Delta n$ is the change in index of refraction caused by stress and
$f_0$ is the frequency of the laser source.

To measure pressure:

$$\Delta n = B\Delta P, \text{ and} \tag{2}$$

substituting into equation (1) yields $$\Delta f_1 = B f_0 \Delta P, \tag{3}$$

where B is the resonator photoelastic constant ($10^{-13}$ cm$^2$/dyne) and $\Delta P$ is the change in input pressure (dyne/cm$^2$). To measure strain:

$$\Delta n = BE\Delta \epsilon \tag{4}$$

where E is the resonator modulus of elasticity (dyne/cm$^2$) and $\Delta\epsilon$ is a change in unit strain (cm/cm). Therefore, from equation (1):

$$\Delta f_1 = BE f_0 \Delta\epsilon. \tag{5}$$

In measuring current or voltage:

$$\Delta n = K_1 \Delta V \text{ for current, and} \tag{6}$$

$$\Delta n = K_2 \Delta V \text{ for voltage,} \tag{7}$$

where $K_1$ and $K_2$ are constants which are a function of the converter and electro-optic material. Therefore from equation (1):

$$\Delta f_1 = K_1 \Delta V f_0 \text{ for current and} \tag{8}$$

$$\Delta f_1 = K_2 \Delta V f_0 \text{ for voltage.} \tag{9}$$

Figure 3:
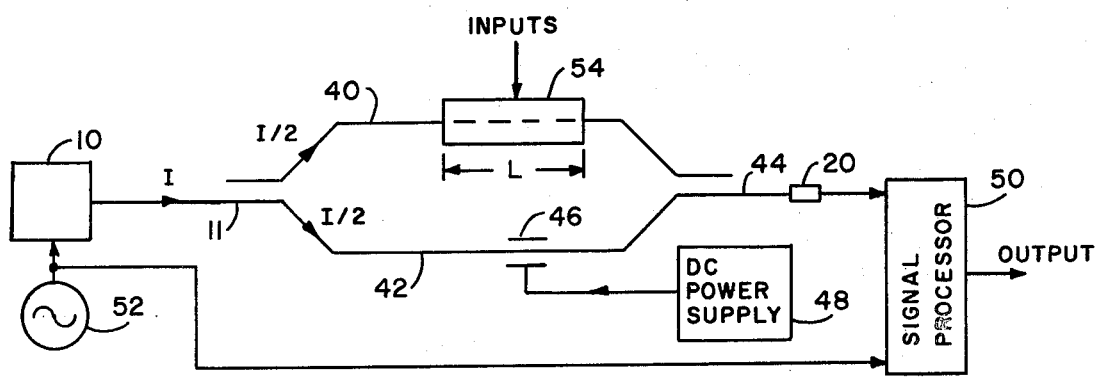
FIG. 3 is an alternate embodiment, a phase detection transducer using integrated optics and electronics.

An alternate embodiment of the invention is shown in FIG. 3. Generally an output laser beam is phase modified and detected by a detector in proportion to the change in magnitude of the input forces, pressure, strain, voltage or current. For phase detection the beam is split, a first part of the beam being directed along a first path toward a detector, and a second part of the beam is directed along a second path toward the same detector. One beam passes through an unstressed waveguide and the other beam passes through a stressed photoelastic electro-optic waveguide. The phase difference between the stressed and unstressed waveguides is proportional to a change in input. The two beams exit the waveguides and are coupled to the detector where an interference condition is established.

In operation, a laser 10 generates a laser beam having intensity I which travels in input waveguides 11 prior to being split via W-W-DC into two beams with intensity I/2. One beam travels in the signal waveguide 40 which is subject to input forces from a stress transfer element 54 that stresses the waveguide, changing its optical path length (OPL). The other beam continues to travel in the reference waveguide 42 and passes through an electro-optic phase bias element 46. The bias voltage for element 46 is supplied by power supply 48, providing a 90° phase lag between the two beams when there is no input stress. The detection of small stresses in waveguide 40 are detected because the beams are separated by 90°, which is the maximum slope point. The two beams are added in waveguide 44 and the resulting interference signal is detected by detector 20. The output of detector 20 is coupled to a signal processor 50 where the transducer output is developed.

Output signals from processor 50 may be coupled to any monitoring system such as a visual display or a computer. The laser modulator 52 drives laser 10 and also provides a reference signal to processor 50, providing detector shot-noise-limited operation.

For the structure of FIG. 3, the stress transfer element 54 is similar to the particular elements 28, 30, or 32 shown in FIGS. 2A-2C, depending on the particular stress being measured. The primary difference is that, in FIG. 3, stress is applied to only one portion of the waveguide (40) and that is substantially along a straight line. In FIG. 1, the stress transfer members are circular, covering the entire surface over resonator 16.

The phase change $\Delta\phi$ between the beams can be derived as follows:

$$\Delta\phi = \Delta n L/\lambda \tag{10}$$

wherein $\Delta n$ is the change in index of refraction caused by stress, L is the length of waveguide being stressed, and $\lambda$ is the wavelength of the laser beam. To measure pressure:

$$\Delta n = B\Delta P \tag{11}$$

where B is the waveguide photoelastic constant ($10^{-13}$ cm$^2$/dyne) and $\Delta P$ is the change in pressure (dyne/cm$^2$). Using equations 10 and 11:

$$\Delta\phi = B\Delta P L/\lambda. \tag{12}$$

To measure strain:

$$\Delta n = BE\Delta\epsilon, \tag{13}$$

where E is the waveguide modulus of elasticity (dyne/cm$^2$) and $\Delta\epsilon$ is a change in unit strain (cm/cm). Using equations 10 and 13:

$$\Delta\phi = BEL\Delta\epsilon/\lambda. \tag{14}$$

To measure voltage v or current i, the change in index $\Delta n$ is as follows:

$$\Delta n = K_1 \Delta V \text{ (Current)}, \tag{15}$$

$$\Delta n = K_2 \Delta V \text{ (Voltage)}, \tag{16}$$

where $K_1$ and $K_2$ are constants which are a function of the converter and the electro-optic transfer material ($\Delta n/\Delta V$). From equation 10:

$$\Delta\phi = K\Delta V L/\lambda. \tag{17}$$

The equations for beam intensity at the detector are:

$$I_o = I(1 + \cos \Delta\phi) \tag{18}$$

where
$I_o$ = intensity at detector and
$I$ = laser beam intensity.
For a 90° phase lag:

$$I_o = I[1 + (\cos \phi - 90°)] = I(1 + \sin \Delta\phi). \tag{19}$$

The primary goal of integrated optics is to integrate a variety of discrete optical elements, both active and passive, into a monolithic, miniaturized planar structure. It is an optical analogy of integrated circuit technology in the electronics industries. By this analogy, it is reasonable to assume that optical systems in the integrated optics configuration can be made more efficient, compact and stable at lower cost. In the embodiments shown, which are monolithic structures, gallium-arsenide is used as the substrate. Other substrates may be resorted to such as silicon or lithium-niobate, however, in these structures an interface must be used between the laser and the substrates and the detectors.

Obviously many modifications and variations of the present invention are possible in the light of the above teachings. It is therefore to be understood that within the scope of the appended claims the invention may be practiced otherwise than as specifically described.

I claim:

1. A transducer comprising: a laser for generating a beam of coherent light, a photodetector, a photoelastic optical waveguide means disposed between said laser and said photodetector for providing an optical path for said beam of light therebetween, stress transfer means disposed adjacent to said waveguide means for subjecting a portion of said waveguide means to stress forces, modulating means disposed for modulating said beam of light prior to its passage through said waveguide means, and feedback means responsive to said photodetector for providing a variable voltage feedback to said modulating means in response to said stress forces, said variable voltage feedback being indicative of said stress forces and said waveguide means comprising an input waveguide, an output waveguide, and a ring resonator waveguide therebetween, said stress forces being applied to said ring resonator.

2. A transducer as set forth in claim 1 wherein said modulating means is dual Bragg cells responsive to said feedback and disposed between said laser and said input waveguide, and said stress transfer means being in the shape of a ring and being disposed substantially coincident with the ring surface of said ring resonator waveguide.

3. A transducer as set forth in claim 2 wherein said feedback means comprises at least a modulator circuit responsive to said photodetector for providing a variable voltage to said modulating means.

4. A transducer as set forth in claim 3 and further comprising a demodulator circuit coupled to said modulator circuit for detecting said variable feedback voltage and providing an output responsive thereto.

5. A transducer as set forth in claim 4 wherein said laser, Bragg cells, and waveguide means are formed in a photoelastic, electro-optic substrate.

6. A transducer as set forth in claim 5 wherein said stress transfer means is a proof mass disposed for transfering forces to said ring resonator that are normal to the plane of travel of laser light within said resonator.

7. A transducer as set forth in claim 5 wherein said stress transfer means is a proof mass disposed for applying forces to said ring resonator that are parallel to the plane of said resonator.

8. A transducer as set forth in claim 5 wherein said stress transfer means comprise an electro-mechanical stress producing member and an electrical signal converter for converting electrical input signals to an incremental, variable voltage output, said stress producing member being responsive to said voltage output for providing a mechanical force to said waveguide for stressing said waveguide.

* * * * *